United States Patent [19]

Mikami et al.

[11] 4,302,474
[45] Nov. 24, 1981

[54] PROCESS FOR PREPARING MAYONNAISE-LIKE FOODS

[75] Inventors: Yasuo Mikami, Yokohama; Hiroshi Kanda, Zushi; Akio Uno, Yokohama, all of Japan

[73] Assignee: Nisshin Oil Mills, Ltd., Tokyo, Japan

[21] Appl. No.: 177,556

[22] Filed: Aug. 13, 1980

Related U.S. Application Data

[63] Continuation-in-part of Ser. No. 123,250, Feb. 21, 1980.

[30] Foreign Application Priority Data

May 8, 1980 [JP] Japan .................................. 55-60007

[51] Int. Cl.³ .............................................. A23L 1/24
[52] U.S. Cl. ....................................... 426/52; 426/656; 426/656; 426/654; 426/804; 426/589; 426/604
[58] Field of Search .................. 426/46, 49, 63, 656, 426/589, 602, 604, 613, 804, 605, 654, 52

[56] References Cited

U.S. PATENT DOCUMENTS

| | | | |
|---|---|---|---|
| 3,764,347 | 10/1973 | Katz | 426/605 |
| 3,864,500 | 2/1975 | Lynn | 426/613 |
| 3,865,956 | 2/1975 | Fukushima | 426/613 |
| 3,867,560 | 2/1975 | Menzi | 426/656 |
| 3,892,873 | 7/1975 | Kolen | 426/602 |
| 3,932,672 | 1/1976 | Pour-El et al. | 426/46 |
| 4,119,733 | 10/1978 | Hish | 426/46 |
| 4,163,808 | 8/1979 | De Paolis | 426/613 |

*Primary Examiner*—Jeanette M. Hunter
*Attorney, Agent, or Firm*—Sughrue, Mion, Zinn, Macpeak and Seas

[57] ABSTRACT

Refined soybean proteins are prepared by solubilizing an alcohol-denatured soybean protein with protease and separating insoluble materials. The refined soybean protein thus obtained is used as an emulsifier instead of eggs in mayonnaise-like foods.

The squeezing property of the mayonnaise-like food upon extruding from a plastic tubular container is improved by effecting a partial hydrolysis of the protein till a specific degree and limiting the content of the refined soybean protein to a specific range.

3 Claims, No Drawings

PROCESS FOR PREPARING MAYONNAISE-LIKE FOODS

CROSS REFERENCE TO RELATED APPLICATIONS

This application is a continuation-in-part of our copending application Ser. No. 123,250, filed Feb. 21, 1980 for "Process for Preparing Mayonnaise-like Foods".

BACKGROUND OF THE INVENTION

This invention relates to a process for the preparation of mayonnaise-like foods using a specifically refined soybean protein instead of eggs as an emulsifier and particularly, to mayonnaise-like foods with good squeezing property.

The term of squeezing property means the state in smoothness and form maintaining property of the extrudate from a plastic tubular container. A good squeezing property is in the state of smoothness and has a moderate softness and form maintaining property.

Recently, the trend of wanting foods free of cholesterol for health is rising, and in the field of mayonnaise there have been provided methods for the preparation of mayonnaise-like foods using soybean protein instead of eggs as an emulsifier.

It is, hitherto, known that the emulsifying ability of conventional soybean proteins is increased to some extent by hydrolyzing partially soybean proteins with enzyme. Surprisingly, it has been found that when soybean protein having the solubility reduced by an alcohol denaturation is solubilized with enzymolysis, an emulsifying ability and emulsification stability are remarkably improved. Based on this finding there has been provided a process for the preparation of mayonnaise-like foods comprising solubilizing an alcohol-denatured soybean protein with protease till 15-35% in a solubility of protein by a 10% aqueous solution of trichloroacetic acid, separating water-soluble materials to obtain refined soybean proteins and emulsifying the refined soybean protein together with edible oils, vinegars, seasonings and others (our copending application Ser. No. 123,250).

However, the mayonnaise-like foods using partially hydrolyzed soybean proteins instead of eggs as an emulsifier have a tendency that the squeezing property upon extruding from a plastic tube is inferior. Thus, there are disadvantages that the extrudate is too soft to maintain the form or has a hard, gel-like form so the surface becomes rough and cleaves.

SUMMARY OF THE INVENTION

An object of this invention is to provide mayonnaise-like foods with good squeezing property as well as good emulsification stability, using a specific soybean protein instead of eggs as an emulsifier.

The foregoing can be attained by preparing mayonnaise-like foods in a process which comprises the first step of effecting a partial hydrolysis of an alcohol-denatured soybean protein with protease till a solubility of the protein by trichloroacetic acid has reached about 8-15% by weight and removing water-insoluble materials to obtain refined soybean proteins and the second step of adding edible oils, vinegars, seasonings and others to said refined soybean protein in such a manner that the content of the refined soybean protein as dry is within the range of more than 0.5% by weight and less than 2.5% by weight based on the total weight of the final product and emulsifying them together.

DETAILED DESCRIPTION OF THE INVENTION

In the mayonnaise-like food obtained by this invention, the squeezing property is improved in that the extrudate from a plastic tube exhibits a moderate softness and form maintaining property and has the surface of smoothness.

The alcohol denaturation used herein means that the molecular structure of protein is converted to a water-insoluble condition by washing with alcohols. As the denaturation degree becomes higher, the solubility of protein in water becomes lower.

The starting soybean protein which may be used in this invention may be a defatted soybean flour or soybean proteins prepared therefrom, such as an extracted soybean protein and an isolated soybean protein. The starting soybean protein is washed with alcohols, preferably a water containing alcohol. With this washing the flavor and color of the protein are markedly reduced. A higher level in the denaturation degree of preferred because it has a favorable influence upon the subsequent emulsification stability.

The alcohol washing is carried out in conventional methods by using an alcohol concentration of about 50-80% (W/W) in a weight ratio of solvent to soybean protein of about 5-fold to 20-fold. The washing temperature is, preferably below a boiling point at the aqueous alcohol concentration. Also, an alcohol vapor may be used.

The protein thus obtained is little taste of soybean protein and the color is improved, but the solubility is decreased by the alcohol denaturation and therefore, cannot be used for the preparation of mayonnaise-like foods. Next, the alcohol-denatured protein is added with water and dispersed, which is then subject to a pH adjustment and thereafter, a neutral or alkaline protease such as Bioprase SP-4 (the trademark by Nagase Sangyo, Japan), papain and Alkalase (the trademark by Novo Comp., Denmark) is added to effect enzymolysis while stirring slowly. At this time the pH and temperature are, preferably an optimum pH of the enzyme used and an optimum temperature thereby to promote an enzyme reaction. For adjusting a pH acids or salts for foods, e.g. hydrochloric acid, acetic acid, sodium hydroxide, ammonia water and sodium bicarbonate may be used.

After having reached the desired level of enzymolysis, the pH of the treated solution is adjusted to a pH of 9.5 with the alkaline agent used for the above pH adjustment and the enzyme is inactivated by heating. The temperature for inactivating enzyme may vary depending on the type of enzyme, though the inactivation is attained by heating at temperatures above 90° C.

The enzyme reaction is stopped when a solubility of the protein by a 10% aqueous solution of trichloroacetic acid (hereinafter referred to as "a 10% TCA solubilization rate") has reached about 8-15% by weight.

A 10% TCA solubilization rate may be measured as follows:

2 g of a sample of protein powders treated with enzyme are dissolved in 48 g of water and 50 g of a 20% aqueous TCA solution are added thereto and vibrated sufficiently. The resulting precipitates are centrifuged and then, 10 g of the supernatant solution are sampled.

Nitrogen is measured in accordance with Kjeldahl method.

On the other hand, total nitrogen of the protein powder sample used is measured and a 10% TCA solubilization rate is calculated by the following formula:

10% TCA Solubilization Rate (%) = Nitrogen in 10 g of the Supernatant ×10 (mg)/Total Nitrogen in 2 g of the Sample (mg) ×100

When the TCA solubilization rate is less than about 8%, the resulting mayonnaise-like food is inferior in emulsification stability and apt to separate. On the other hand, when the TCA solubilization rate exceeds 15%, the viscosity of the product is decreased so that the form upon extruding from a plastic container cannot be maintained.

The treated solution after inactivation of enzyme is subject, for example, to centrifuge and water-insoluble materials are removed to obtain a refined soybean protein solution. Mayonnaise-like foods may be prepared by adding edible oils, vinegars and seasonings directly to the solution obtained above and emulsifying together. The refined soybean protein solution thus obtained or powders prepared therefrom by drying are improved in a flavor and color and have good emulsification performance, particularly at an acidic pH so that mayonnaise-like foods are prepared with good emulsification stability.

By way of example, mayonnaise-like foods are conveniently preparedd from the refined soybean protein as follows:

To a solution of refined soybean protein or one obtained by dissolving its powders again in water are added seasonings such as salt, sodium glutamate, nucleic acid type seasonings, sugar and other and if desired, pastes are further dispersed and dissolved therein. Natural coloring matters, oil-soluble spices and herbs and tocopherol may be preliminarily dissolved in an edible oil.

The soybean protein solution and edible oil thus obtained are emulsified by means of an emulsifier such as puddle mixer, agitator, Homomixer (the tradename of Tokushukika Kogyo, Japan) or colloid mill.

The amount of the refined soybean protein in solution or powders to be incorporated is within the range of more than 0.5% and less than 2.5% by weight as dry based on the total weight of the mayonnaise-like food, so that the squeezing property upon extruding from a plastic tubular container is improved. When the refined soybean protein content is less than about 0.5%, the product is inferior in the emulsification stability so that it is apt to separate and also, the squeezing property is insufficient and the viscosity is lowered. On the other hand, when the refined soybean protein content is more than about 2.5%, the emulsification stability is improved, but the squeezing property is insufficient to maintain the form and the extrudate lacks smoothness and its surface cleaves.

Mayonnaise-like foods thus obtained are free of flavor peculiar to soybean and have a plain taste and a good emulsification stability.

According to this invention, mayonnaise-like foods using no eggs are provided and therefore, there is no need to feel misgivings about cholesterol as opposed to the conventional mayonnaise.

EXAMPLE 1

20 Kg of a slightly denatured, defatted soybean were washed with 200 Kg of an aqueous 60 W/W % solution of ethanol in a sealed tank at 50° C. for 30 minutes. After filtration 32 Kg of cake were obtained and transferred into a pressure-reduced drier. After drying at 70° C., 13.5 Kg of a powdered, concentrated soybean protein were obtained.

Analysis on this product was as follows: Water 6.5%, Protein (based on dry) 67%, Nitrogen Solubility Index (NSI) 11.0%

Next, the whole amount of the above product was added to 150 l of warm water (60° C.) in a tank provided with jacket and dispersed while stirring. Caustic soda was added to adjust a pH to 8.5.

50 g of Bioprase SP-4 (the trademark by Nagase Sangyo, Japan) were added and reaction was conducted for indicated times at 55° C. and then, a pH was adjusted to 9.5 by caustic soda. The enzyme was inactivated by heating at 90° C. for 15 minutes.

10 l of each of the solution enzymolyzed for 30 minutes, 60 minutes, 90 minutes and 120 minutes, respectively was centrifuged to remove water-insoluble materials. As to the protein solution thus obtained, a 10% TCA solubilization rate was measured. The results are set forth in Table 1.

TABLE 1

| Refined Soybean Protein No. | 1 | 2 | 3 | 4 |
|---|---|---|---|---|
| Enzymolyzation Time, minute | 30 | 60 | 90 | 120 |
| TCA Solubilization Rate, % | 7.5 | 12.5 | 14.5 | 21 |

Next, each of the protein solution was neutralized to a pH of 7.0 hydrochloric acid. After spray-drying, about 9 Kg of each of the refined soybean products were obtained, from which mayonnaise-like foods were prepared in accordance with the following formulation:

| Soybean Salad Oil | 550 g |
|---|---|
| Vinegar | 150 g |
| Seasonings | 30 g |
| Spices and Herbs | 10 g |
| Refined Soybean Protein | 15 g |
| Tamarind Gum | 2 g |
| Water | 243 g |

The seasonings, spices and herbs, refined soybean protein and Tamarind gum were previously dispersed in water. The soybean salad oil was added dropwise and emulsified with Homomixer. After adding the vinegar emulsification was further conducted and thus, 1 Kg of mayonnaise-like food was obtained.

200 g of the product were filled in a plastic container. An emulsification stability and squeezing property were tested. The emulsification stability was rated by the preservation at 40° C. for a week. The results are set forth in Table 2.

TABLE 2

| Refined Soybean Protein | Emulsification Stability | Viscosity* cps | Squeezing Property | |
|---|---|---|---|---|
| | | | Form Maintaining Property | Smoothness |
| No. 1 | Water off | 120,000 | Good | Hard, the surface cleaves |
| No. 2 | Good | 80,000 | Good | Good |
| No. 3 | Good | 60,000 | Good | Good |

TABLE 2-continued

| Refined Soybean Protein | Emulsification Stability | Viscosity* cps | Squeezing Property Form Maintaining Property | Smoothness |
|---|---|---|---|---|
| No. 4 | Good | 25,000 | Flagging | Soft |

*Measured by BM type of Brookfield Viscosimeter

The above Table shows that good squeezing property is obtained in the range of 10–15% of the TCA solubilization rate.

EXAMPLE 2

Each of No. 2 and No. 4 of the refined soybean protein obtained in Example 1 was added in an amount of 0.5%, 1.5% and 2.5% by weight, respectively based on the weight of the product and the whole amount was adjusted with water to prepare mayonnaise-like foods in the same manner as in Example 1. 200 g of the product were filled in a plastic container and the emulsification stability and squeezing property were tested. The results are set forth in Table 3.

TABLE 3

| Refined Soybean Protein No. | Amount, % | Emulsification Stability | Viscosity cps | Squeezing Property Form Maintaining Property | Smoothness |
|---|---|---|---|---|---|
| 2 | 0.5 | Oil off | 35,000 | Somewhat Flagging | Soft |
|   | 1.5 | Good | 80,000 | Good | Good |
|   | 2.5 | Good | 150,000 | Breakable | Hard, the surface cleaves |
| 4 | 0.5 | Oil off | 15,000 | Flagging | Very soft |
|   | 1.5 | Good | 25,000 | Flagging | Soft |
|   | 2.5 | Good | 130,000 | Breakable | Hard, the surface cleaves |

As is apparent from the Table, the refined soybean protein content and the TCA solubilization rate have a delicate influence on the squeezing property of mayonnaise-like food upon extruding from a plastic container.

What is claimed is:

1. A process for the preparation of a mayonnaisde food which comprises the first step of effecting a partial hydrolysis of an alcohol-denatured soybean protein with protease until the solubility of the protein in a 10% by weight aqueous solution of tricholoroacetic acid has reached about 8–15% by weight and removing water-insoluble materials to obtain refined soybean proteins and the second step of adding edible oils, vinegars and seasonings to said refined soybean protein in such a manner that the content of the refined soybean protein on a dry basis is within the range of more than 0.5% by weight and less than 2.5% by weight based on the total weight of the final product and emulsifying them together.

2. The process of claim 1 wherein the alcohol denaturation of soybean protein is effected by washing with a water-containing alcohol of a concentration of about 50–80% by weight.

3. A mayonnaise food obtained in accordance with the process of claim 1.

* * * * *